US012808218B2

(12) United States Patent
Zhang et al.

(10) Patent No.: US 12,808,218 B2
(45) Date of Patent: Nov. 24, 2026

(54) MOVABLE OPERATING APPARATUS AND AUTOMATIC POOL CLEANING DEVICE USING SAME

(71) Applicant: WARM REFRIGERATION EQUIPMENT (SHANGHAI) CO., LTD QIDONG BRANCH, Nantong (CN)

(72) Inventors: Zenan Zhang, Nantong (CN); Kailong Chen, Nantong (CN)

(73) Assignee: WARM REFRIGERATION EQUIPMENT (SHANGHAI) CO., LTD QIDONG BRANCH, Nantong (CN)

( * ) Notice: Subject to any disclaimer, the term of this patent is extended or adjusted under 35 U.S.C. 154(b) by 354 days.

(21) Appl. No.: 18/582,706

(22) Filed: Feb. 21, 2024

(65) Prior Publication Data

US 2024/0376736 A1 Nov. 14, 2024

(30) Foreign Application Priority Data

May 8, 2023 (CN) ......................... 202310510186.4

(51) Int. Cl.
*E04H 4/16* (2006.01)
*G07C 9/00* (2020.01)

(52) U.S. Cl.
CPC ....... *E04H 4/1654* (2013.01); *G07C 9/00722* (2013.01)

(58) Field of Classification Search
CPC ..................................................... E04H 4/1654
USPC ....................................................... 340/691.8
See application file for complete search history.

(56) References Cited

U.S. PATENT DOCUMENTS

| | | | | |
|---|---|---|---|---|
| 11,753,840 B1 * | 9/2023 | Zhong | E04H 4/16 15/1.7 |
| 12,079,003 B1 * | 9/2024 | Zhao | G05D 1/0246 |
| 2007/0067930 A1 * | 3/2007 | Garti | E04H 4/1654 15/1.7 |
| 2017/0356212 A1 * | 12/2017 | Hanan | E04H 4/1654 |
| 2018/0266134 A1 * | 9/2018 | Pichon | H04N 23/90 |
| 2019/0330869 A1 * | 10/2019 | Durvasula | G05D 1/0208 |
| 2023/0374807 A1 * | 11/2023 | Liu | E04H 4/1654 |
| 2024/0240481 A1 * | 7/2024 | Wang | E04H 4/1654 |
| 2025/0067074 A1 * | 2/2025 | Pichon | G05D 1/0206 |
| 2025/0215716 A1 * | 7/2025 | Zhang | E04H 4/1654 |
| 2026/0028842 A1 * | 1/2026 | Li | E04H 4/1263 |

* cited by examiner

*Primary Examiner* — Travis R Hunnings
(74) *Attorney, Agent, or Firm* — IPRTOP LLC

(57) ABSTRACT

The automatic pool cleaning device performs wireless communication and uses a battery. The movable operating apparatus includes: at least one buoyance operating end, an electric control lock, and a locking member. The locking member limits the buoyance operating end when the electric control lock is in a locked state, and removes the limitation when the electric control lock is in an unlocked state. A lock control circuit which unlocks the electric control lock in response to a trigger signal generated when the automatic pool cleaning device stops working, such that the buoyance operating end floats and carries the traction rope out of the accommodation chamber to a water surface. The buoyance operating end is configured to move the automatic pool cleaning device out of a swimming pool in response to a user's operation. The wireless automatic pool cleaning device can be taken out of the pool conveniently and quickly.

12 Claims, 7 Drawing Sheets

MOVABLE OPERATING APPARATUS AND AUTOMATIC POOL CLEANING DEVICE USING SAME

TECHNICAL FIELD

The present disclosure relates to the technical field of intelligent devices, and in particular to a movable operating apparatus and an automatic pool cleaning device using same.

BACKGROUND OF THE INVENTION

With the development of intelligent robot technology, robots are emerging in various subdivided scenarios in people's daily lives, replacing manual labor, reducing users' working time, and improving happiness. For example, a swimming pool cleaning robot can automatically travel on a bottom wall and side walls of a swimming pool and suck dirt during traveling.

A traditional swimming pool cleaning robot is connected to a control device on the shore via a cable for power supply and control. In order to simplify the structure, there are currently swimming pool cleaning robots that use batteries for local power supply, and communicate with a user's remote control terminal through wireless communication for control, such as power on and off, motion control, etc. In this way, the cable can be omitted.

However, without the cable, the swimming pool cleaning robot has limited power. When its battery is low, the swimming pool cleaning robot often can only stay at the bottom of the swimming pool and does not have the energy to climb the side wall to reach a water surface. This leads to a major difficulty, which is that it is difficult for a user to move the swimming pool cleaning robot out of the swimming pool from the bottom of the swimming pool. Usually, the swimming pool cleaning robot can only be hooked out by extending a hooked rod, etc. into the water. However, this operation is a bit challenging and it is not easy to hook the swimming pool cleaning robot; and this operation is also troublesome, which is not conducive to enriching the user experience.

SUMMARY OF THE INVENTION

The present disclosure provides a movable operating apparatus and an automatic pool cleaning device using same.

A first aspect of the present disclosure provides a movable operating apparatus, provided in an automatic pool cleaning device which interacts with an outside terminal wirelessly and uses a battery for local power supply. The movable operating apparatus includes at least one buoyance operating end, located in an accommodation chamber on a surface of the automatic pool cleaning device, and connected to the automatic pool cleaning device via a traction rope; an electric control lock, including a lock driving mechanism driven by an electric signal, and a locking member driven by the lock driving mechanism, where the locking member limits the buoyance operating end when the electric control lock is in a locked state, and removes the limitation when the electric control lock is in an unlocked state; and a lock control circuit, electrically coupled to the electric control lock, and configured to transmit an unlocking signal to the electric control lock to unlock the electric control lock in response to a trigger signal generated when the automatic pool cleaning device stops working, such that the buoyance operating end floats and carries the traction rope out of the accommodation chamber to a water surface. The buoyance operating end is configured to move the automatic pool cleaning device out of a swimming pool in response to a user's operation.

In an embodiment of the first aspect, the electric control lock is a magnetic lock. The electric control lock includes a conductor electrically coupled to the lock control circuit. The conductor generates a current when a voltage is applied across the conductor by the unlocking signal of the lock control circuit, so as to form a magnetic field acting force on the locking member, to drive the locking member to remove the limitation.

In an embodiment of the first aspect, the lock control circuit includes a first switch unit, including: a first terminal, a second terminal, and a third terminal, where the third terminal is electrically coupled to an input terminal of the lock control circuit, to set on/off between the first terminal and the second terminal based on an input unlocking trigger signal, and the second terminal is grounded; a first voltage control unit, including: a first voltage terminal electrically coupled to a power supply terminal, a second voltage terminal electrically coupled to the first terminal of the first switch unit, and a second signal output terminal for outputting a first switching signal based on a voltage difference between the first voltage terminal and the second voltage terminal, where the power supply terminal is configured to apply an input voltage; a second switch unit, including: a fourth terminal, a fifth terminal, and a sixth terminal, where the sixth terminal is electrically coupled to the second signal output terminal of the first voltage control unit to set on/off between the fourth terminal and the fifth terminal based on the first switching signal, and the fourth terminal is electrically coupled to the power supply terminal; a second voltage control unit, including: a third voltage terminal electrically coupled to the fifth terminal of the second switch unit, a fourth voltage terminal grounded, and a third signal output terminal for outputting a second switching signal based on a voltage of the third voltage terminal; a third switch unit, including: a seventh terminal, an eighth terminal, and a ninth terminal, where the ninth terminal is electrically coupled to the third signal output terminal of the second voltage control unit to set on/off between the seventh terminal and the eighth terminal based on the second switching signal, and the eighth terminal is grounded; a first signal output interface configured to be electrically coupled to the lock driving mechanism, including a first power output pin and a second power output pin, where the first power output pin is electrically coupled to the power supply terminal, and the second power output pin is electrically coupled to the seventh terminal of the third switch unit. The first switch unit, the second switch unit, and the third switch unit have the same on/off state; and when the first switch unit is turned on by the unlocking trigger signal, the second switch unit is turned on by the first switching signal, and the third switch unit is turned on by the second switching signal, such that an output voltage for the lock driving mechanism is generated between the first power output pin and the second power output pin of the first signal output interface to serve as the unlocking signal.

In an embodiment of the first aspect, the lock control circuit includes: an N-type first triode having a base electrode electrically coupled to the input terminal of the lock control circuit, and an emitter electrode grounded; a first voltage divider circuit, including: a first resistor and a second resistor, where one end of the first resistor is electrically coupled to one end of the second resistor to form a first voltage divider output terminal, the other end of the first resistor is electrically coupled to the power supply terminal, and the other end of the second resistor is electrically coupled to a collector electrode of the first transistor; a P-type second triode having a base electrode electrically coupled to the first voltage divider output terminal, and an emitter electrode electrically coupled to the power supply terminal; a second voltage divider circuit, including: a third resistor and a fourth resistor, where one end of the third resistor is electrically coupled to one end of the fourth resistor to form a second voltage divider output terminal, the other end of the third resistor is electrically coupled to a collector electrode of the P-type second triode, and the other end of the fourth resistor is grounded; an NMOS, having a gate electrode electrically coupled to the second voltage divider output terminal, and a drain grounded; and a second signal output interface configured to be electrically coupled to the lock driving mechanism, including a third power output pin and a fourth power output pin, where the third power output pin is electrically coupled to the power supply terminal, and the fourth power output pin is electrically coupled to a source electrode of the NMOS.

In an embodiment of the first aspect, the automatic pool cleaning device includes a controller, where the controller includes: a lock control signal output terminal, a communication terminal, and a voltage detection terminal. The lock control signal output terminal is electrically coupled to the input terminal of the lock control circuit, the communication terminal is electrically coupled to a wireless communication circuit, and the voltage detection terminal is electrically coupled to an output terminal of a voltage detection circuit. An input terminal of the voltage detection circuit is electrically coupled to the battery, for outputting a voltage detection signal corresponding to an output voltage of the battery. The controller generates the trigger signal and transmits the trigger signal to the lock control circuit when receiving a shutdown signal from the wireless communication circuit or determining that the battery is low according to the voltage detection signal for the battery.

In an embodiment of the first aspect, the buoyance operating end includes a gripping portion adapted to a gripping shape of a user's hand.

In an embodiment of the first aspect, the number of the at least one buoyance operating end is no less than two, and/or the at least one buoyance operating end is arranged on a top of a front end or a rear end of the automatic pool cleaning device.

In an embodiment of the first aspect, the movable operating apparatus includes a rope collecting member arranged in the accommodation chamber, hooked to the traction rope, and configured to wind the traction rope.

In an embodiment of the first aspect, the movable operating apparatus includes: an electric rope retractor. The electric rope retractor includes a rope winding mechanism and a rope retracting drive motor for driving the rope winding mechanism to act. The rope retracting drive motor is coupled to the battery via an electric line to obtain power supply. The rope retracting drive motor is electrically coupled to a rope winding signal output terminal of the controller, and controls the rope winding mechanism to wind up the traction rope in response to a rope winding control signal output from the rope winding signal output terminal. The rope winding control signal is generated based on a wireless control signal received by a wireless communication circuit electrically coupled to the controller.

In an embodiment of the first aspect, the buoyance operating end includes: a swimming mechanism, and a swimming drive motor configured to drive the swimming mechanism to act. The swimming drive motor is coupled to the battery via an electric line, or is coupled to a second battery carried by the buoyance operating end to obtain power supply. The swimming drive motor controls the swimming mechanism to swim in at least one direction in response to a swimming trigger signal.

In an embodiment of the first aspect, the swimming drive motor is coupled to the battery via the electric line that is located in the traction rope.

A second aspect of the present disclosure provides an automatic pool cleaning device, including: a housing provided with the accommodation chamber on its surface, the movable operating apparatus of any one of the embodiments in the first aspect provided in the accommodation chamber; and a circuit system arranged in the housing, where the circuit system includes the battery, the wireless communication circuit, and the controller. The controller is coupled to the battery and the wireless communication circuit, and the controller is electrically coupled to the lock control circuit in the movable operating apparatus.

In an embodiment of the second aspect, the controller is configured to, when detecting a signal indicating to stop working, control the automatic pool cleaning device to move close to the edge of a pool.

As described above, the embodiments of the present disclosure provide the movable operating apparatus and the automatic pool cleaning device using same. The automatic pool cleaning device performs wireless communication and uses a battery. The movable operating apparatus includes: at least one buoyance operating end located in the accommodation chamber on the surface of the automatic pool cleaning device, and connected to the automatic pool cleaning device via the traction rope; the electric control lock, including the lock driving mechanism driven by the electric signal, and the locking member driven by the lock driving mechanism, where the locking member limits the buoyance operating end when the electric control lock is in a locked state, and removes the limitation when the electric control lock is in an unlocked state; and a lock control circuit electrically coupled to the electric control lock, and configured to transmit an unlocking signal to the electric control lock to unlock the electric control lock in response to the trigger signal generated when the automatic pool cleaning device stops working, such that the buoyance operating end floats and carries the traction rope out of the accommodation chamber to a water surface. The buoyance operating end is configured to move the automatic pool cleaning device out of a swimming pool in response to a user's operation. With the movable operating apparatus, the wireless automatic pool cleaning device can be moved out of the pool conveniently and quickly.

DETAILED DESCRIPTION OF THE INVENTION

Figure 1:
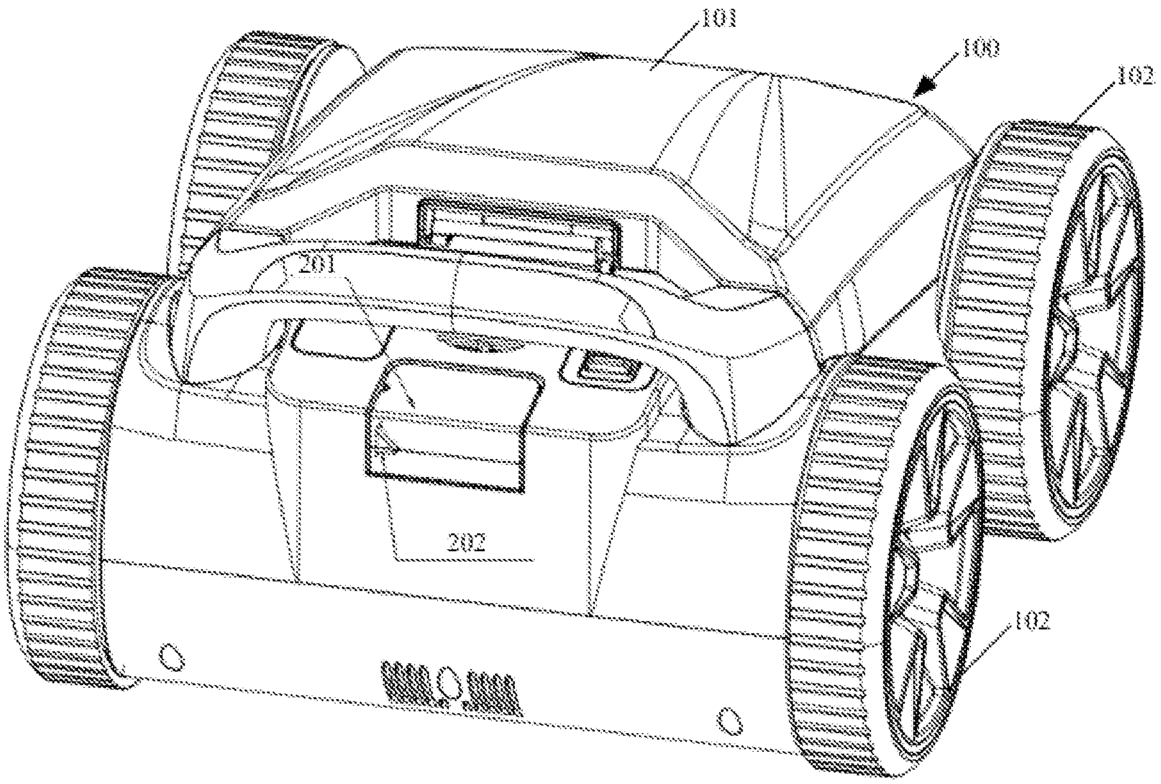
FIG. 1 illustrates a schematic structural diagram of an automatic pool cleaning device equipped with a movable operating apparatus according to an embodiment of the present disclosure.

Implementations of the present disclosure are described below by means of specific examples, and those skilled in the art would have readily understood other advantages and effects of the present disclosure from the context disclosed in the present disclosure. The present disclosure may also be implemented or applied by means of other different specific embodiments, and various details in the present disclosure may also be modified or changed according to different viewpoints and applications without departing from the spirit of the present disclosure. It should be noted that the embodiments in the present disclosure and the features in those embodiments can be combined with each other without conflict.

The embodiments of the present disclosure will be described in detail below with reference to the accompanying drawings, so that those skilled in the art to which the present disclosure belongs can easily implement them. The present disclosure can be embodied in many different forms and is not limited to the embodiments described herein.

In the description of the present disclosure, reference terms "an embodiment", "some embodiments", "an example", "a particular example" or "some examples" and so on mean that particular features, structures, materials, or properties described in conjunction with this embodiment or example are contained in at least one embodiment or example of the present disclosure. Moreover, the described particular features, structures, materials, or properties may be combined in a suitable manner in any one, or any one group of, embodiments or examples. In addition, those skilled in the art may combine different embodiments or examples described in the present disclosure and the features of different embodiments or examples without contradiction.

In addition, the terms "first" and "second" are used for descriptive purposes only, and cannot be construed as indicating or implying relative importance or implicitly indicating the number of technical features illustrated. Therefore, the features defined with "first" and "second" may explicitly or implicitly comprise at least one of the features. In the description of the present disclosure, the term "a group of" means two or more, unless otherwise explicitly and specifically defined.

In order to clearly explain the present disclosure, components irrelevant to the description are omitted, and the same or similar elements throughout the description are given the same reference signs.

Throughout the description, when a first component is said to be "connected" to a second component, this includes not only a "direct connection" but also an "indirect connection" with another element being interposed therebetween. In addition, when a certain component "comprises" a certain element, it does not exclude other elements, but means that other elements may also be included unless otherwise specified.

Although in some examples the terms "first", "second", etc. are used herein to refer to various elements, these elements should not be limited by these terms. These terms are only used to distinguish one element from another element. For example, a first interface, a second interface, etc. are described. Furthermore, as used herein, the singular forms "a", "an", and "the" are intended to include plural forms as well, unless otherwise indicated in the context. It should be further understood that the terms "including" and "comprising" indicate the presence of stated features, steps, operations, elements, modules, items, categories, and/or groups, but do not exclude the presence, occurrence, or addition of one or a group of other features, steps, operations, elements, modules, items, categories, and/or groups. The terms "or" and "and/or" as used herein are to be construed as inclusive or to mean any one or any combination. Therefore, "A, B, or C" or "A, B, and/or C" means "any one of: A; B; C; A and B; A and C; B and C; and A, B, and C". Exceptions to this definition occur only when the combination of elements, functions, steps, or operations is inherently mutually exclusive in some manner.

The technical terms used herein are only used to refer to specific embodiments and are not intended to limit the present disclosure. The singular form used herein also includes the plural form as long as the opposite meaning is not expressly indicated in the sentence. The meaning of "comprising/including" used in the description is to specify specific characteristics, regions, integers, steps, operations, elements, and/or components, and does not exclude the presence or addition of other characteristics, regions, integers, steps, operations, elements, and/or components.

Although not differently defined, all terms including technical and scientific terms used herein have the same meaning as commonly understood by those skilled in the art to which the present disclosure belongs. Terms defined in commonly used dictionaries are additionally interpreted to have meanings that are consistent with the relevant technical literature and current prompt information. As long as they are not defined, they shall not be overly interpreted into ideal or very formulaic meanings.

At present, swimming pool cleaning robots are widely used, which can help people and automatically clean underwater surfaces of swimming pools, replacing manual labor, improving efficiency, and enriching user experience. However, during the transforming from traditional swimming pool cleaning robots that use wired power supply and communication to new swimming pool cleaning robots with wireless communication and local battery power supply, it is difficult for a user to take it out of a swimming pool due to there is no cable on the wireless swimming pool cleaning robot, and it can only be taken out with the help of tools, resulting in poor user experience.

In view of this, embodiments of the present disclosure provide a movable operating apparatus, which is arranged in an automatic pool cleaning device to facilitate a user to take the automatic pool cleaning device out of a pool, thus improving the user experience. It should be understood that the "automatic pool cleaning device" may include the aforementioned swimming pool cleaning robot for use in the swimming pool. Of course, the "automatic pool cleaning device" may also be used in other types of pools, such as bathing pools, not limited to swimming pools.

Figure 2:
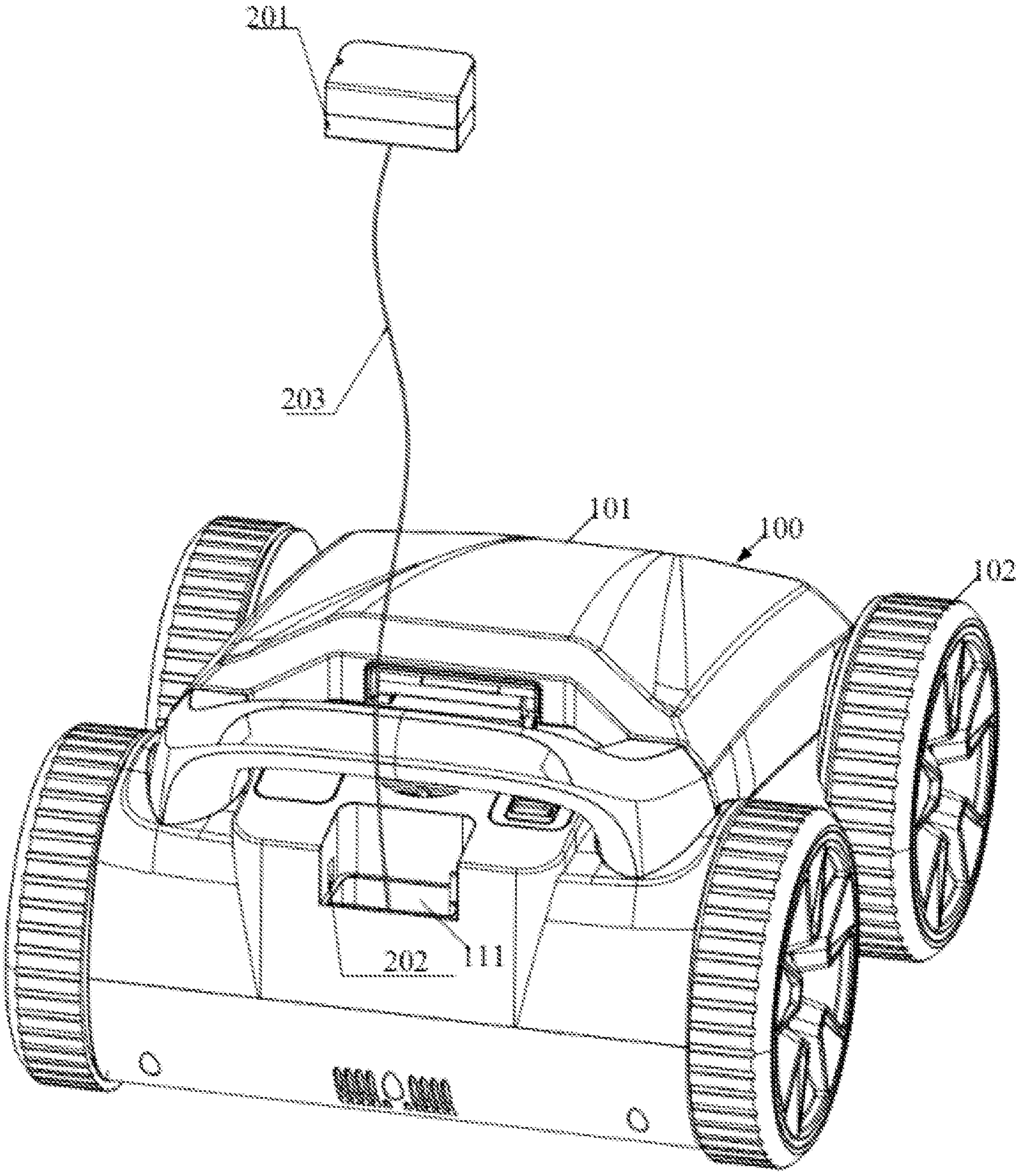
FIG. 2 illustrates a schematic structural diagram of the movable operating apparatus of the automatic pool cleaning device in FIG. 1 after releasing a buoyant end.

Referring to FIGS. 1 and 2, FIG. 1 illustrates a schematic structural diagram of an automatic pool cleaning device equipped with a movable operating apparatus according to an embodiment of the present disclosure, and FIG. 2 illustrates a schematic structural diagram of the movable operating apparatus of the automatic pool cleaning device in FIG. 1 after releasing a buoyant end.

In FIG. 1, an automatic pool cleaning device 100 equipped with the movable operating apparatus is shown. Illustratively, the automatic pool cleaning device 100 may be a swimming pool robot that works wirelessly. The automatic pool cleaning device 100 communicates with an outside terminal wirelessly, for example, it communicates with and is controlled by a handheld terminal of a user, and is powered by batteries, thereby eliminating the need for traditional cable connections. Illustratively, the handheld terminal may be a remote controller, or a mobile terminal (such as a smart phone or a tablet) which runs software to control the automatic pool cleaning device 100.

The automatic pool cleaning device 100 includes a housing 101 and cleaning rollers, where the cleaning rollers are arranged at the housing 101 and capable of rolling forward and backward. The two cleaning rollers 102 at a front and a rear end of the automatic pool cleaning device 100 respectively are configured to travel and sweep debris backward. The rolling of the front cleaning rollers 102 causes the debris to reach the bottom of a body of the automatic pool cleaning device 100. A lower surface of the housing 101 of the automatic pool cleaning device 100 may be provided with a water inlet and a water outlet, for sucking a water flow carrying the debris and delivering it out from the water outlet at another position of the housing 101, while the debris is filtered and intercepted by a filter component provided in the automatic pool cleaning device 100.

Referring to FIG. 2, an accommodation chamber 111 is provided on a surface of the housing 101, and the movable operating apparatus is arranged in the accommodation chamber 111. Illustratively, the movable operating apparatus in FIG. 1 is provided on a top surface at a rear end of the housing 101, but in other embodiments, the movable operating apparatus may be provided on the top surface at a front end, or other locations of the housing 101.

The movable operating apparatus includes a buoyance operating end, which is located in the accommodation chamber 111 and is locked and limited by an electric control lock 202. Illustratively, the buoyance operating end may be a floating box, in which a cavity may be included. Optionally, the cavity may also be filled with air or other gases that increase buoyance.

In practical applications, when the automatic pool cleaning device 100 is working normally, the buoyance operating end is restricted in the accommodation chamber 111. In FIG. 2, when the automatic pool cleaning device 100 is going to stop working, the restriction can be removed to release the buoyance operating end, and then the buoyance operating end floats from the automatic pool cleaning device 100 to a water surface under the buoyance effect of water. The buoyance operating end 201 is connected to the automatic pool cleaning device 100 via a traction rope 203. The buoyance operating end 201 is configured to move the automatic pool cleaning device 100 out of a pool in response to a user's operation. That is, the user can hold the buoyance operating end 201 floating on the water surface and pull the traction rope 203 to take the automatic pool cleaning device 100 out of the pool.

In some embodiments, the number of buoyance operating ends 201 may be more than one, that is, there may be multiple buoyance operating ends 201, which are arranged at different positions on the top surface of the automatic pool cleaning device. Multiple buoyance operating ends 201 may work individually or together, that is the buoyance operating ends 201 may be released selectively or together. For example, if one of the buoyance operating ends 201 cannot be released due to a fault, the release of another buoyance operating end 201 can also ensure normal working. Alternatively, multiple buoyance operating ends 201 can be released together, which increases the buoyance and is also convenient for the user to drag the automatic pool cleaning device.

Figure 3:
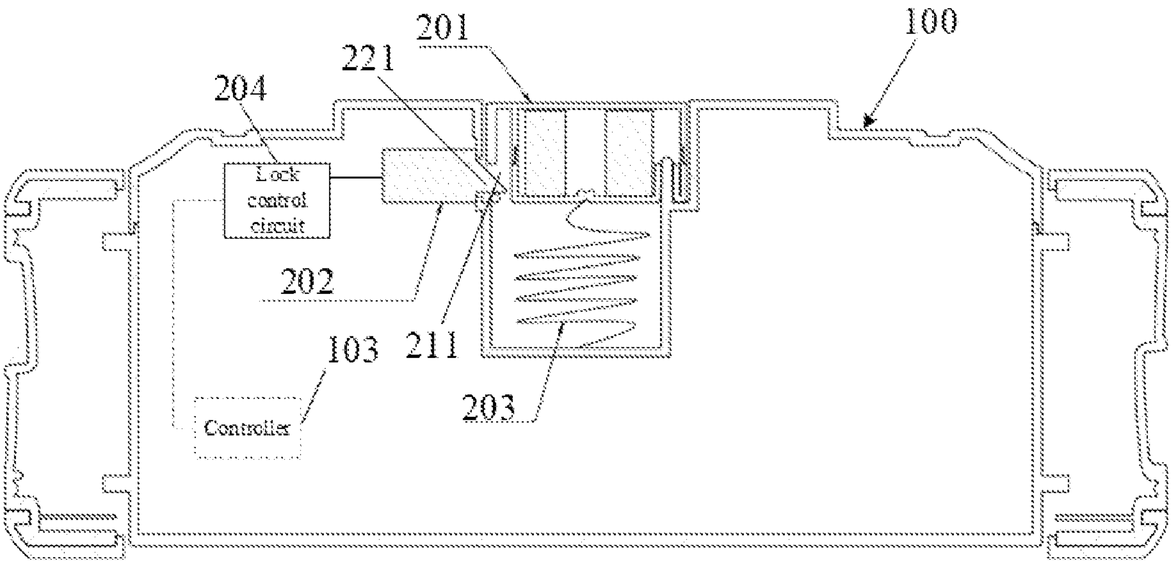
FIG. 3 illustrates a schematic structural diagram of the automatic pool cleaning device in which the movable operating apparatus is locked and fixed according to an embodiment of the present disclosure.
Figure 4:
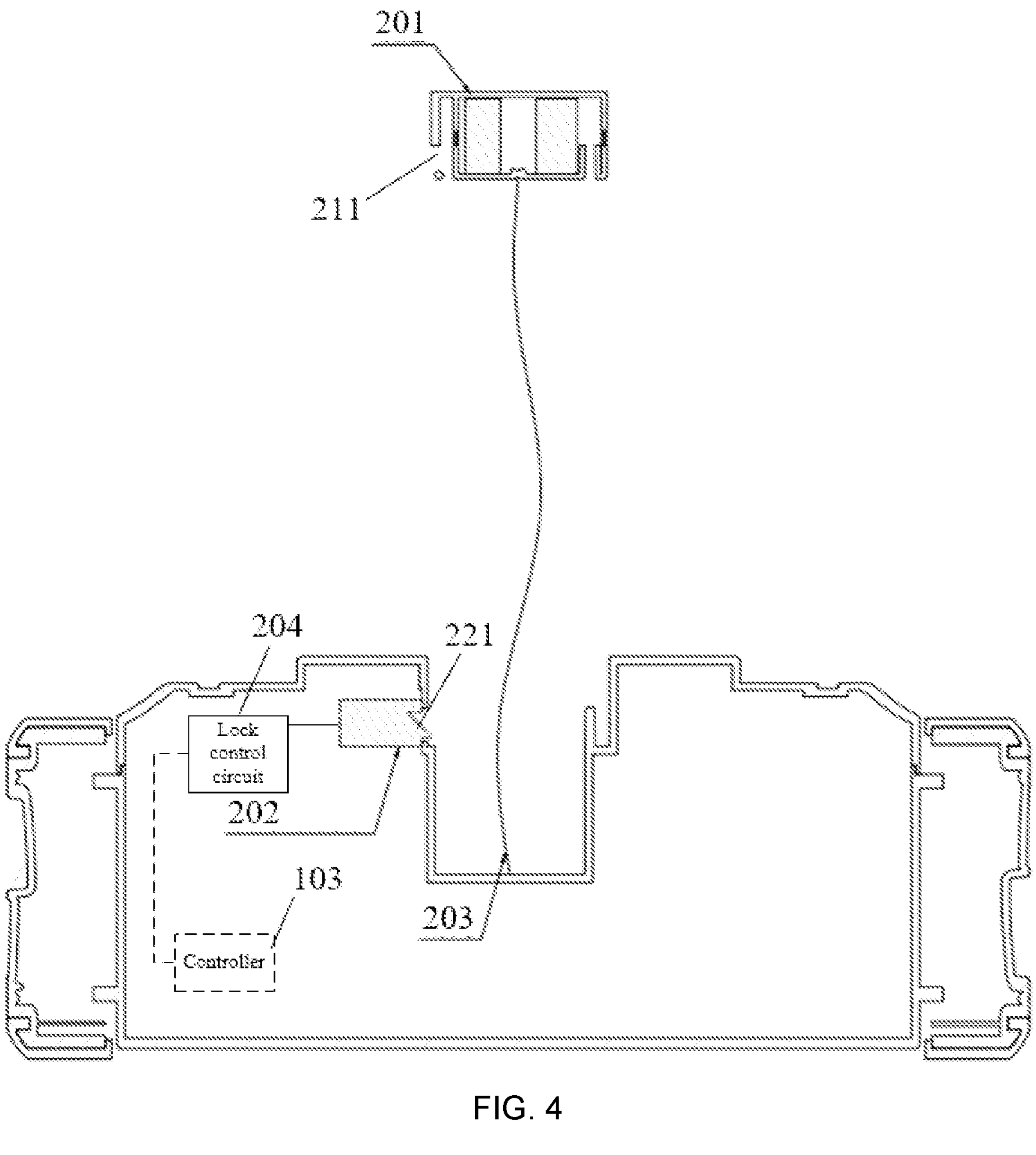
FIG. 4 illustrates a schematic structural diagram of a buoyance operating end floating after the movable operating apparatus in the automatic pool cleaning device is unlocked according to an embodiment of the present disclosure.

To illustrate the structure of the movable operating apparatus in the above examples, reference can be made to FIGS. 3 and 4. FIG. 3 illustrates a schematic structural diagram of the automatic pool cleaning device in which the movable operating apparatus is locked and fixed according to an embodiment of the present disclosure. FIG. 4 illustrates a schematic structural diagram of a buoyance operating end floating after the movable operating apparatus in the automatic pool cleaning device is unlocked according to an embodiment of the present disclosure.

As shown in FIG. 3, in addition to the buoyance operating end 201 and the electric control lock 202, the movable operating apparatus includes a lock control circuit 204 for controlling a locked/unlocked state of the electric control lock 202.

The electric control lock 202 includes a lock driving mechanism driven by an electric signal, and a locking member 221 driven by the lock driving mechanism. The locking member 221 limits the buoyance operating end 201 when the electric control lock 202 is in the locked state, and removes the limitation when the electric control lock 202 is in the unlocked state. The locking member 221 may be a locking tongue of the electric control lock 202. As shown in FIG. 3, when the electric control lock 202 is in the locked state, the locking tongue extends into an opening 211 of the buoyance operating end 201 to limit the buoyance operating end 201. Alternatively, as shown in FIG. 4, when the electric control lock 202 is in the unlocked state, the locking tongue is retracted from the opening 211 to remove the limitation on the buoyance operating end 201, so that the buoyance operating end 201 floats upwardly under the buoyance effect of water.

The lock control circuit 204 is electrically coupled to the electric control lock 202, and is configured to send an unlocking signal to the electric control lock 202 to unlock the electric control lock 202 in response to an unlocking trigger signal generated when the automatic pool cleaning device 100 stops working, such that the buoyance operating end 201 floats and carries the traction rope 203 out of the accommodation chamber and to the water surface.

In some embodiments, the electric control lock 202 may be a magnetic lock. The electric control lock 202 includes a conductor, which is electrically coupled to the lock control circuit 204 and generates a current when a voltage is applied across the conductor by the unlocking signal of the lock control circuit 204, so as to form a magnetic field acting force on the locking member 221, to drive the locking member 221 to remove the limitation. As an example, the conductor may be, for example, silicon steel, and the locking member 221 may be made of a metal material (such as iron) that can be affected by magnetic force.

In some embodiments, when the electric control lock 202 is in the locked state, the locking member 221 maintains an extended state. An elastic member may be provided at its rear end, and the elastic member is, for example, an elastic piece or a spring. When the elastic member is not in a compressed state, the locking member 221 maintains the extended state and fits the opening of the buoyance operating end 201. When the electric control lock 202 is unlocked, a voltage is applied across the conductor, to generate a current flowing through the conductor. A magnetic field is formed around the current, and a magnetic attraction force is generated on the locking member 221, to pull the locking member 221 to the left to complete the removal of the limitation, and the elastic member is compressed due to the movement of the locking member 221. When the voltage disappears, the locking member 221 can be restored under an elastic force of the elastic member.

In some embodiments, the traction rope 203 may be, for example, made of nylon material, PVC material, etc. The traction rope 203 is preferably made of a corrosion-resistant material, or may be made of a waterproof material or a material undergone waterproof treatment.

In some embodiments, the automatic pool cleaning device 100 stops working when, for example, it receives a shutdown instruction (e.g., through wireless communication) or the battery is low (e.g., when the power supply voltage is lower than a preset threshold). The lock control circuit 204 can obtain the unlocking trigger signal generated from the working stopping circumstances described above, such as the shutdown instruction or the low battery power, and output an unlocking instruction to the electric control lock 202. The unlocking instruction may be an output voltage signal applied across the conductor in the electric control lock 202.

The automatic pool cleaning device 100 may include a controller 103. The controller 103 may be a main controller 103 or other auxiliary controllers 103 of the automatic pool cleaning device 100. The controller 103 may be implemented as a control chip or include a control chip. Each pin of the control chip may be connected to a corresponding detection circuit to detect the shutdown instruction, a voltage detection signal of the battery for determining whether the power is low, and other information, so as to generate the unlocking trigger signal and transmit it to the lock control circuit 204. In some embodiments, the control chip may be implemented as a microcontrol unit (MCU), a system on a chip (SoC), or an application specific integrated circuit (ASIC). In a possible example, the control chip may be, for example, an SoC or MCU chip of the PY32F030 series, HK32W030 series, STM32G030 series, N32G030 series, etc. It should be understood that the above are merely some examples of implementations of the control chips. Of course, there are many other types of existing chips that can realize the functions of the control chips in the above embodiments. Although the applicant cannot exhaustively list the types of chips, these chips can also fall within the protection scope of the present disclosure.

Figure 5:
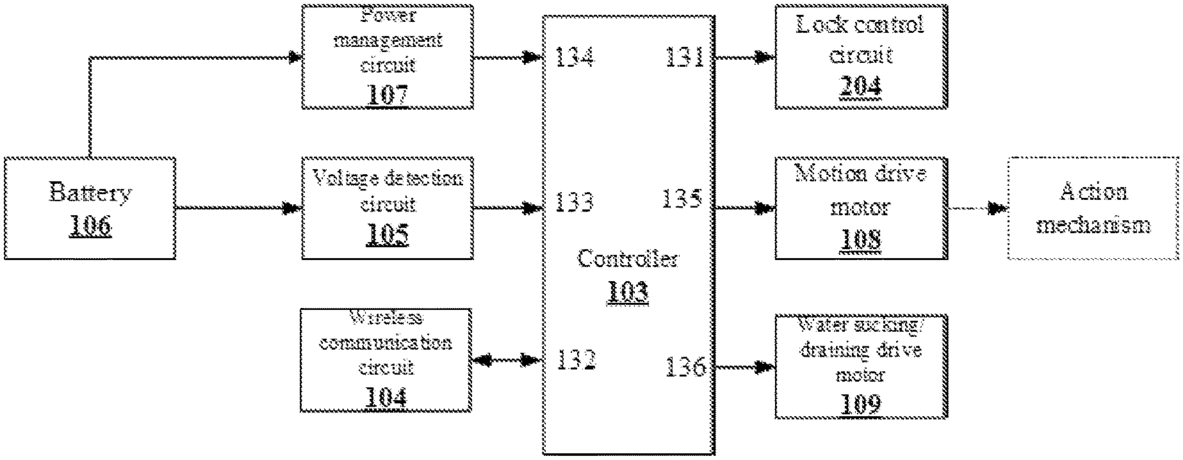
FIG. 5 illustrates a schematic diagram of a circuit module of the automatic pool cleaning device for controlling the movable operating apparatus according to an embodiment of the present disclosure.

FIG. 5 illustrates a schematic diagram of a circuit module of the automatic pool cleaning device 100 for controlling the movable operating apparatus according to an embodiment of the present disclosure.

In FIG. 5, the controller 103 includes: a lock control signal output terminal 131, a communication terminal 132, and a voltage detection terminal 133. The lock control signal output terminal 131 is electrically coupled to an input terminal of the lock control circuit 204, and the communication terminal 132 is electrically coupled to a wireless communication circuit 104.

Illustratively, the wireless communication circuit 104 includes but is not limited to at least one of: WiFi, Bluetooth, infrared, 3G/4G/5G, NB-IOT, Zigbee, Lora, etc.

Illustratively, the voltage detection terminal 133 is electrically coupled to an output terminal of a voltage detection circuit 105. An input terminal of the voltage detection circuit 105 is electrically coupled to the battery 106, for outputting the voltage detection signal corresponding to an output voltage of the battery 106. The controller 103 generates the unlocking trigger signal and sends the unlocking trigger signal to the lock control circuit 204 based on receiving the shutdown signal from the wireless communication circuit 104 or based on determining that the battery 106 is low according to the voltage detection signal of the battery 106. Illustratively, the voltage detection circuit 105 may be implemented based on a sampling circuit for the output voltage of the battery 106, such as a voltage divider circuit. Illustratively, the controller 103 may include an analog-to-digital converter, a comparator, etc. The analog-to-digital converter is configured to convert the analog voltage detection signal into a digital quantity representing the output voltage of the battery 106. The comparator may be configured to compare the digital quantity with a preset threshold to determine whether the output voltage of the battery 106 is lower than the certain voltage threshold and thus has low power.

Illustratively, the controller 103 may further include an electric supply terminal 134. The battery 106 may be coupled to an input terminal of a power management circuit 107, and an output terminal of the power management circuit 107 is coupled to the electric supply terminal 134 to power the controller 103. Illustratively, the power management circuit 107 may include a filtering circuit, a transforming circuit, and other circuits, to generate one or more power supply voltages (such as 24 V, 12 V, 5 V, 3.3 V, and the like) to adapt to different operating voltage requirements of an element.

Illustratively, the controller 103 may further include a motion control instruction terminal 135 and a water sucking and draining control instruction terminal 136. The motion control instruction terminal 135 may be coupled to a motion drive motor 108 (or a water sucking/draining drive motor) of an action mechanism (such as the two pairs of cleaning rollers in FIG. 1) of the automatic pool cleaning device 100 to perform motion control. Generally, one of a pair of cleaning rollers is a driving roller and the other is a driven roller, and the motion drive motor 108 may only be connected to and power the driving roller. In a possible example, when detecting a signal indicating to stop working, the controller 103 controls the automatic pool cleaning device 100 to move close to an edge of the pool. For example, when detecting the shutdown instruction or that the battery 106 is low, the controller 103 controls the motion drive motor 108 to drive the motion drive motor 108, the water sucking/draining drive motor 109, etc., such that the automatic pool cleaning device 100 moves close to the edge of the pool. It should be understood that the motion drive motor 108 may be configured to drive the forward and backward movement of the action mechanism, and the water sucking/draining drive motor 109 may be configured to drive the water suction and drainage actions of the automatic pool cleaning device 100, which cooperates with the forward and backward movement of the action mechanism to achieve steering. For example, in the document of Chinese Patent Publication No. CN214835161U, impulsive forces generated from water draining from asymmetric water outlets are used to tilt a swimming pool robot, and the steering is achieved in conjunction with forward and backward movement. In some embodiments, the automatic pool cleaning device 100 may identify the edge of the pool through a distance sensor (e.g., an ultrasonic sensor), or may determine the edge of the pool through records of collisions and travel trajectories. Furthermore, the automatic pool cleaning device 100 may use SLAM technology to draw a map of the pool, in which the edge of the pool is included.

It should be understood that when the power of the automatic pool cleaning device 100 is low, the automatic pool cleaning device 100 moves to the edge of the pool, and the buoyance operating end 201 is released. The buoyance operating end 201 is also close to the shore, which is more convenient for the user to take and operate, thus enriching the user experience.

Figure 6:
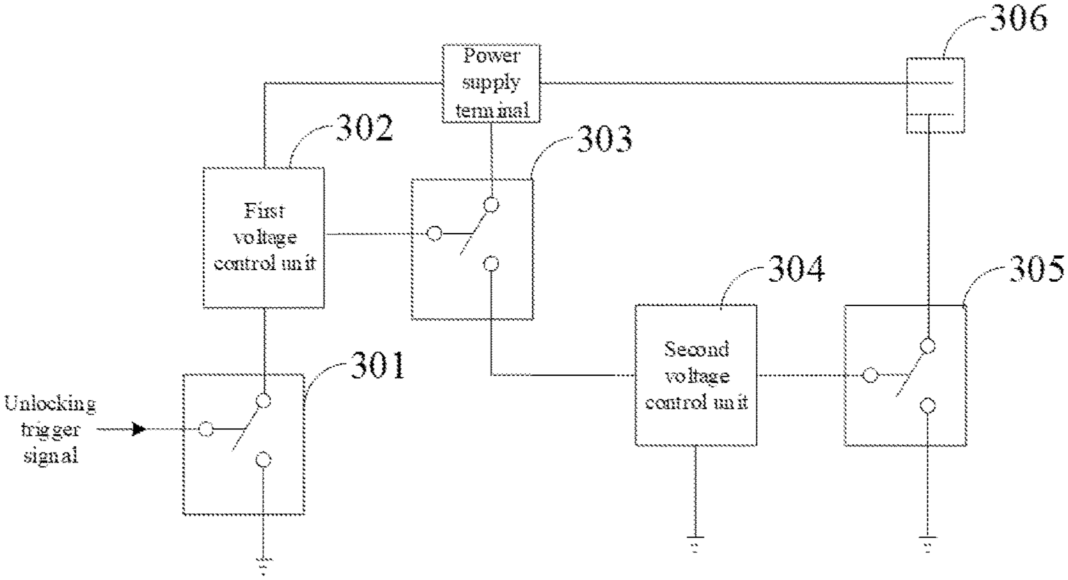
FIG. 6 illustrates a schematic diagram of a circuit module of a lock control circuit according to an embodiment of the present disclosure.

Further, as shown in FIG. 6, a schematic diagram of a circuit module of the lock control circuit according to an embodiment of the present disclosure is illustrated.

As an example, the lock control circuit includes: a first switch unit 301, a first voltage control unit 302, a second switch unit 303, a second voltage control unit 304, a third switch unit 305, and a first signal output interface 306.

The first switch unit 301 includes: a first terminal, a second terminal, and a third terminal. The third terminal is electrically coupled to the input terminal of the lock control circuit, to set on/off between the first terminal and the second terminal based on the input unlocking trigger signal, and the second terminal is grounded.

The first voltage control unit 302 includes: a first voltage terminal electrically coupled to a power supply terminal 307, a second voltage terminal electrically coupled to the first terminal of the first switch unit 301, and a second signal output terminal for outputting a first switching signal based on a voltage difference between the first voltage terminal and the second voltage terminal. The power supply terminal 307 is configured to apply an input voltage.

The second switch unit 303 includes: a fourth terminal, a fifth terminal, and a sixth terminal. The sixth terminal is electrically coupled to the second signal output terminal of the first voltage control unit 302 to set on/off between the fourth terminal and the fifth terminal based on the first switching signal, and the fourth terminal is electrically coupled to the power supply terminal 307.

The second voltage control unit 304 includes: a third voltage terminal electrically coupled to the fifth terminal of the second switch unit 303, a fourth voltage terminal grounded, and a third signal output terminal for outputting a second switching signal based on a voltage of the third voltage terminal.

The third switch unit 305 includes: a seventh terminal, an eighth terminal, and a ninth terminal. The ninth terminal is electrically coupled to the third signal output terminal of the second voltage control unit 304 to set on/off between the seventh terminal and the eighth terminal based on the second switching signal, and the eighth terminal is grounded.

The first signal output interface 306 is configured to be electrically coupled to the lock driving mechanism, and includes a first power output pin 361 and a second power output pin 362. The first power output pin 361 is electrically coupled to the power supply terminal 307, and the second power output pin 362 is electrically coupled to the seventh terminal of the third switch unit 305.

The first switch unit 301, the second switch unit 303, and the third switch unit 305 have the same on/off state. Illustratively, the first switch unit 301, the second switch unit 303, and the third switch unit 305 may be implemented by triodes or MOS transistors. In order to achieve the same on/off state, as an example, the first switch unit 301 may be an N-type triode or MOS transistor, the second switch unit 303 may be a P-type triode or MOS transistor, and the third switch unit 305 may be an N-type triode or MOS transistor. Illustratively, the first voltage control unit 302 and the second voltage control unit 304 may be implemented by voltage divider circuits, which can proportionally adjust the output voltage to a voltage range suitable for the transistors.

When the first switch unit 301 is turned on by the unlocking trigger signal, the second switch unit 303 is turned on by the first switching signal, and the third switch unit 305 is turned on by the second switching signal, such that an output voltage generated between the first power output pin 361 and the second power output pin 362 of the first signal output interface for the lock driving mechanism serves as the unlocking signal. Specifically, when the first switch unit 301, the second switch unit 303, and the third switch unit 305 are not turned on, the second power output pin 362 is disconnected and cannot form a loop, which is coupled to the electric control lock, with the first power output pin 361. While when the third switch unit 305 is turned on as the first switch unit 301 and the second switch unit 303 are turned on, the second power output pin 362 is pulled down to the ground, and a voltage difference is formed between the voltage on the second power output pin 362 and the voltage on the first power output pin 361 from the power supply terminal 307, where the voltage difference is output to the electric control lock for unlocking.

Figure 7:
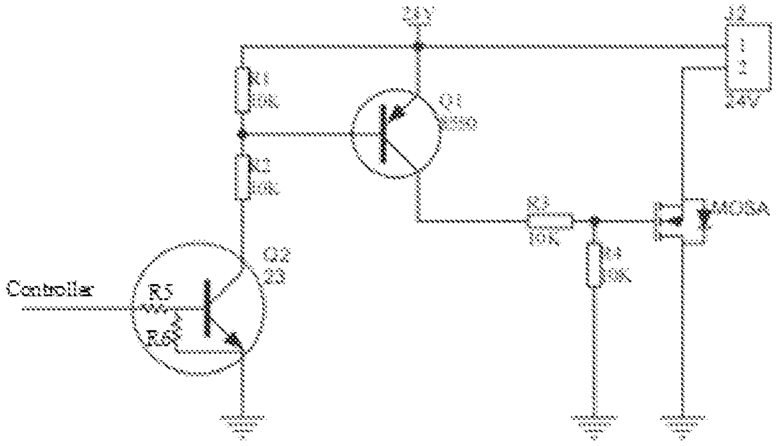
FIG. 7 illustrates a schematic circuit diagram of the lock control circuit according to an embodiment of the present disclosure.

Further, as shown in FIG. 7, a schematic circuit diagram of the lock control circuit according to an embodiment of the present disclosure is illustrated.

In FIG. 7, the lock control circuit includes: an N-type first triode Q2, a first voltage divider circuit, a P-type second triode Q1, a second voltage divider circuit, an NMOS MOSA, and a second signal output interface J2.

The N-type first triode has a base electrode electrically coupled to the input terminal of the lock control circuit, and an emitter electrode grounded. Illustratively, a resistor R5 may be coupled between the base electrode and the input terminal of the lock control circuit, and the base electrode is also connected to the ground via a resistor R6. R5 and R6 form a voltage divider circuit with a voltage divider point located at the base electrode, such that when the voltage of an input signal is greater than an operating voltage range of Q2, the voltage of the input signal can also be adjusted into the operating voltage range of Q2.

The first voltage divider circuit includes: a first resistor R1 and a second resistor R2. One end of the first resistor is electrically coupled to one end of the second resistor to form a first voltage divider output terminal, the other end of the first resistor is electrically coupled to the power supply terminal (e.g., a power supply of 24V), and the other end of the second resistor is electrically coupled to a collector electrode of the first triode.

The P-type second triode has a base electrode electrically coupled to the first voltage divider output terminal, and an emitter electrode electrically coupled to the power supply terminal.

The second voltage divider circuit includes: a third resistor R3 and a fourth resistor R4. One end of the third resistor is electrically coupled to one end of the fourth resistor to form a second voltage divider output terminal, the other end of the third resistor is electrically coupled to a collector electrode of the second triode, and the other end of the fourth resistor is grounded.

The NMOS MOSA has a gate electrode electrically coupled to the second voltage divider output terminal, and a drain electrode grounded.

The second signal output interface J2 is configured to be electrically coupled to the lock driving mechanism, and includes a third power output pin 1 and a fourth power output pin 2. The third power output pin is electrically coupled to the power supply terminal, and the fourth power output pin is electrically coupled to a source electrode of the NMOS.

Specifically, the controller transmits a high-level unlocking trigger signal to turn on Q2, and the voltage divider point between R1 and R2 outputs a divided voltage of the voltage between the power supply terminal and the collector electrode of Q2 (the potential of the collector electrode of Q2 is pulled down by the grounded terminal after Q2 is turned on), where the divided voltage is at low-level. The low-level voltage acts on the base electrode of Q1 to turn Q1 on, and the collector electrode of Q1 outputs a high-level voltage, which is divided by R3 and R4 and output to the gate electrode of MOSA, to turn MOSA on and pull the potential of the fourth power output pin 2 of J2 down to the ground. The third power output pin 1 of J2 is connected to the power supply terminal, and J2 thus outputs a voltage of 24V to the electric control lock at this time.

It should be noted that the schematic diagram of the lock control circuit illustrated in FIG. 7 is only an example and can be changed in other embodiments, and is not limited thereto. For example, the number and type of the switch units and the voltage divider circuit, etc. can be changed.

In some embodiments, the buoyance operating end includes a gripping portion (not shown) adapted to a gripping shape of a user's hand. For example, a surface of the buoyance operating end is in the form of an arc-shaped and inwardly recessed structure. Illustratively, the arc-shaped and inwardly recessed structure may be a smooth curved surface, or may be provided with multiple recesses that fit the user's fingers.

In some embodiments, the movable operating apparatus includes a rope collecting member (not shown), which is arranged in the accommodation chamber, hooked to the traction rope, and configured to wind the traction rope. The rope collecting member may be in the form of a bar-shaped body having a winding groove. In order to facilitate the user to quickly retract the traction rope after taking out the automatic pool cleaning device, in some embodiments, the movable operating apparatus may include an electric rope retractor (not shown). The electric rope retractor may include a rope winding mechanism and a rope retracting drive motor for driving the rope winding mechanism to act. The rope retracting drive motor is coupled to the battery via an electric line to obtain power supply. The rope retracting drive motor may be electrically coupled to a rope winding signal output terminal of the controller, and controls the rope winding mechanism to wind up the traction rope in response to a rope winding control signal output from the rope winding signal output terminal. The rope winding control signal may be generated based on a wireless control signal received by the wireless communication circuit electrically coupled to the controller. Illustratively, the rope winding mechanism may include a rope winding drum that rolls to wind the traction rope.

Ideally, the position of the buoyance operating end where it emerges from the water surface is as close to the shore as possible to facilitate the user's access. When the automatic pool cleaning device stops working, if it does not have the function of automatically moving close to the edge of the pool, the inconvenience of accessing the buoyance operating end is increased.

To this end, in some embodiments, the buoyance operating end may include a swimming mechanism (not shown), and a swimming drive motor (not shown) configured to drive the swimming mechanism to act. The swimming drive motor may drive the swimming mechanism to swim after the buoyance operating end floats, so as to move the buoyance operating end to the edge of the pool.

Figure 8:
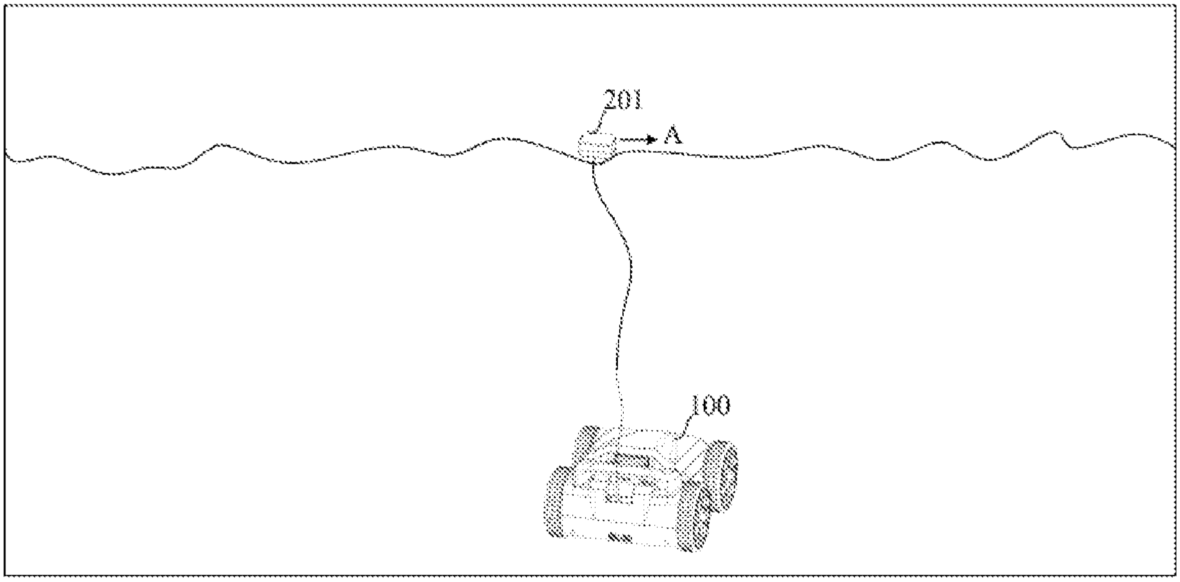
FIGS. 8 and 9 respectively illustrate schematic diagrams of scenarios before and after the buoyance operating end of the movable operating apparatus swims according to an embodiment of the present disclosure.
Figure 9:
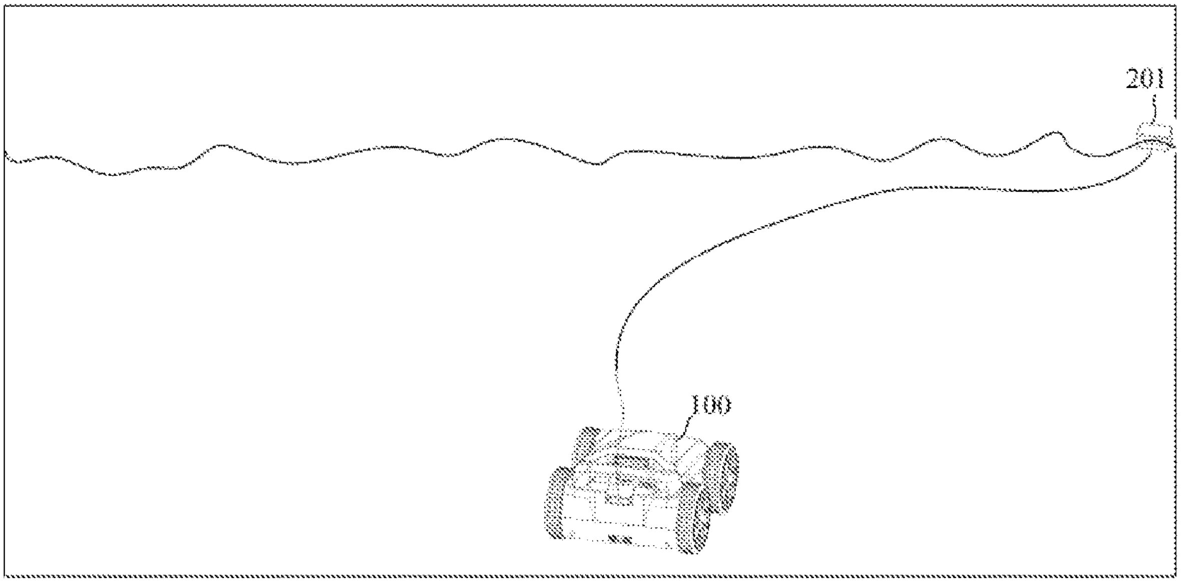

Referring to FIGS. 8 and 9, FIGS. 8 and 9 respectively illustrate schematic diagrams of the buoyance operating end 201 of the movable operating apparatus before and after swimming according to an embodiment of the present disclosure. As can be seen in FIG. 8, the buoyance operating end 201 floats upwardly to the water surface. As can be seen in FIG. 9, the swimming drive motor in the buoyance operating end 201 drives the swimming mechanism to cause the buoyance operating end 201 to swim toward the edge of the pool in direction A, making it easier for the user to access.

Illustratively, the swimming drive motor may be coupled to the battery via an electric line to obtain power supply. Optionally, the electric line may be hidden in the traction rope 203, or may be arranged parallel to the traction rope 203. Alternatively, the buoyance operating end 201 may carry a second battery, and the swimming drive motor may be coupled to the second battery carried by the buoyance operating end 201 to obtain power supply.

As an example, the swimming drive motor controls the swimming mechanism to swim in at least one direction in response to a swimming trigger signal. In an example, the swimming drive motor may be electrically coupled to a swimming control terminal of the controller, and the swimming control terminal may transmit the swimming trigger signal after the lock control signal output terminal transmits the unlocking trigger signal, so as to trigger the working of the swimming drive motor. Alternatively, the swimming drive motor may be electrically coupled to a trigger component (e.g., a travel switch, or a metal contact point), and the trigger component may be provided on the buoyance operating end 201 and/or the housing. When the buoyance operating end 201 floats, for example, the travel switch is pressed or released, or the metal contact point is disconnected, etc., generating the swimming trigger signal and then transmitting it to the swimming drive motor, so that the swimming drive motor can drive the swimming mechanism to swim.

In some embodiments, the swimming mechanism may include one or a pair of propellers, etc., which drive the buoyance operating end 201 to move when rotating. Illustratively, the swimming mechanism may swim in a random direction, and can reach the edge of the pool as long as it swims in one direction on the water surface of the pool. Correspondingly, the length of the traction rope 203 may be set according to actual requirements. For example, the length of the traction rope 203 may be set relatively long so that when the buoyance operating end 201 swims, the automatic pool cleaning device 100 will not be affected as much as possible. For another example, if the driving force of the swimming mechanism is large enough to drive the automatic pool cleaning device 100, the length of the traction rope 203 may be relatively short to drive the automatic pool cleaning device 100 to move close to the edge of the pool, which also makes it easier for the user to take the automatic pool cleaning device out of the pool.

In an embodiment of the present disclosure, an automatic pool cleaning device may also be provided, including: a housing, where the housing is provided with an accommodation chamber on its surface; a movable operating apparatus of any one of the above embodiments, where the movable operating apparatus is provided in the accommodation chamber; and a circuit system arranged in the housing, where the circuit system includes a battery, a wireless communication circuit, and a controller, the controller is coupled to the battery and the wireless communication circuit, and the controller is electrically coupled to a lock control circuit in the movable operating apparatus.

To sum up, the embodiments of the present disclosure provide the movable operating apparatus and the automatic pool cleaning device using same. The automatic pool cleaning device performs wireless communication and uses a battery. The movable operating apparatus includes: at least one buoyance operating end, located in the accommodation chamber on the surface of the automatic pool cleaning device, and connected to the automatic pool cleaning device via the traction rope; the electric control lock, including the lock driving mechanism driven by an electric signal, and the locking member driven by the lock driving mechanism, where the locking member limits the buoyance operating end when the electric control lock is in a locked state, and removes the limitation when the electric control lock is in an unlocked state; and the lock control circuit, electrically coupled to the electric control lock, and configured to transmit the unlocking signal to the electric control lock to unlock the electric control lock in response to the trigger signal generated when the automatic pool cleaning device stops working, such that the buoyance operating end floats and carries the traction rope out of the accommodation chamber to a water surface; where the buoyance operating end is configured to move the automatic pool cleaning device out of a swimming pool in response to a user's operation. With the movable operating apparatus, the wireless automatic pool cleaning device can be taken out of the pool conveniently and quickly.

The above embodiments only illustrate the principles and effects of the present disclosure, but are not used to limit the present disclosure. Those skilled in the art can modify or change the above embodiments without departing from the spirit and scope of the present disclosure. Therefore, all equivalent modifications or changes made by those of ordinary skill in the art without departing from the spirit and technical ideas disclosed in the present disclosure shall still be covered by the claims of the present disclosure.

The invention claimed is:

1. A movable operating apparatus, provided in an automatic pool cleaning device which interacts with an outside terminal wirelessly and uses a battery for local power supply, comprising:

at least one buoyance operating end, located in an accommodation chamber on a surface of the automatic pool cleaning device, and connected to the automatic pool cleaning device via a traction rope;

an electric control lock, comprising a lock driving mechanism driven by an electric signal, and a locking member driven by the lock driving mechanism, wherein the locking member limits the buoyance operating end when the electric control lock is in a locked state, and removes the limitation when the electric control lock is in an unlocked state; and a lock control circuit, electrically coupled to the electric control lock, and configured to transmit an unlocking signal to the electric control lock to unlock the electric control lock in response to a trigger signal generated when the automatic pool cleaning device stops working, such that the buoyance operating end floats and carries the traction rope out of the accommodation chamber to a water surface;

wherein the buoyance operating end is configured to move the automatic pool cleaning device out of a swimming pool in response to a user's operation;

wherein the automatic pool cleaning device comprises a controller, the controller comprising: a lock control signal output terminal, a communication terminal, and a voltage detection terminal;

wherein the lock control signal output terminal is electrically coupled to an input terminal of the lock control circuit, the communication terminal is electrically coupled to a wireless communication circuit, and the voltage detection terminal is electrically coupled to an output terminal of a voltage detection circuit;

wherein an input terminal of the voltage detection circuit is electrically coupled to the battery, for outputting a voltage detection signal corresponding to an output voltage of the battery;

wherein the controller generates the trigger signal and transmits the trigger signal to the lock control circuit when receiving a shutdown signal from the wireless communication circuit or determining that the battery is low according to the voltage detection signal of the battery.

2. The movable operating apparatus according to claim 1, wherein the electric control lock is a magnetic lock; and the electric control lock comprises: a conductor, electrically coupled to the lock control circuit;

wherein the conductor generates a current when a voltage is applied across the conductor by the unlocking signal of the lock control circuit, so as to form a magnetic field acting force on the locking member, to drive the locking member to remove the limitation.

3. The movable operating apparatus according to claim 1, wherein the lock control circuit comprises:

a first switch unit, comprising: a first terminal, a second terminal, and a third terminal, wherein the third terminal is electrically coupled to an input terminal of the lock control circuit, to set on/off between the first terminal and the second terminal based on an input unlocking trigger signal, and the second terminal is grounded;

a first voltage control unit, comprising: a first voltage terminal, electrically coupled to a power supply terminal; a second voltage terminal, electrically coupled to the first terminal of the first switch unit; and a second signal output terminal, for outputting a first switching signal based on a voltage difference between the first voltage terminal and the second voltage terminal; wherein the power supply terminal is configured to apply an input voltage;

a second switch unit, comprising: a fourth terminal, a fifth terminal, and a sixth terminal, wherein the sixth terminal is electrically coupled to the second signal output terminal of the first voltage control unit to set on/off between the fourth terminal and the fifth terminal based on the first switching signal, and the fourth terminal is electrically coupled to the power supply terminal;

a second voltage control unit, comprising: a third voltage terminal, electrically coupled to the fifth terminal of the second switch unit; a fourth voltage terminal grounded; and a third signal output terminal, for outputting a second switching signal based on a voltage of the third voltage terminal;

a third switch unit, comprising: a seventh terminal, an eighth terminal, and a ninth terminal, wherein the ninth terminal is electrically coupled to the third signal output terminal of the second voltage control unit to set on/off between the seventh terminal and the eighth terminal based on the second switching signal, and the eighth terminal is grounded;

a first signal output interface, configured to be electrically coupled to the lock driving mechanism, comprising: a first power output pin and a second power output pin, wherein the first power output pin is electrically coupled to the power supply terminal, and the second power output pin is electrically coupled to the seventh terminal of the third switch unit;

wherein the first switch unit, the second switch unit, and the third switch unit have the same on/off state; and when the first switch unit is turned on by the unlocking trigger signal, the second switch unit is turned on by the first switching signal, and the third switch unit is turned on by the second switching signal, such that an output voltage for the lock driving mechanism is generated between the first power output pin and the second power output pin of the first signal output interface to serve as the unlocking signal.

4. The movable operating apparatus according to claim 1, wherein the lock control circuit comprises:

an N-type first triode, having a base electrode electrically coupled to an input terminal of the lock control circuit, and an emitter electrode grounded;

a first voltage divider circuit, comprising: a first resistor and a second resistor, wherein one end of the first resistor is electrically coupled to one end of the second resistor to form a first voltage divider output terminal, the other end of the first resistor is electrically coupled to a power supply terminal, and the other end of the second resistor is electrically coupled to a collector electrode of the N-type first triode;

a P-type second triode, having a base electrode electrically coupled to the first voltage divider output terminal, and an emitter electrode electrically coupled to the power supply terminal;

a second voltage divider circuit, comprising: a third resistor and a fourth resistor, wherein one end of the third resistor is electrically coupled to one end of the fourth resistor to form a second voltage divider output terminal, the other end of the third resistor is electrically coupled to a collector electrode of the P-type second triode, and the other end of the fourth resistor is grounded;

an NMOS, having a gate electrode electrically coupled to the second voltage divider output terminal, and a drain electrode grounded; and a second signal output interface, configured to be electrically coupled to the lock driving mechanism, comprising: a third power output pin and a fourth power output pin, wherein the third power output pin is electrically coupled to the power supply terminal, and the fourth power output pin is electrically coupled to a source electrode of the NMOS.

5. The movable operating apparatus according to claim 1, wherein the buoyance operating end comprises a gripping portion adapted to a gripping shape of a user's hand.

6. The movable operating apparatus according to claim 1, wherein the number of the at least one buoyance operating end is no less than two, and/or the at least one buoyance operating end is arranged on a top of a front end or a rear end of the automatic pool cleaning device.

7. The movable operating apparatus according to claim 1, comprising: a rope collecting member, arranged in the accommodation chamber, hooked to the traction rope, and configured to wind the traction rope.

8. The movable operating apparatus according to claim 1, comprising: an electric rope retractor, comprising a rope winding mechanism and a rope retracting drive motor for driving the rope winding mechanism to act, wherein the rope retracting drive motor is coupled to the battery via an electric line to obtain power supply;

wherein the rope retracting drive motor is electrically coupled to a rope winding signal output terminal of a controller, and controls the rope winding mechanism to wind up the traction rope in response to a rope winding control signal output from the rope winding signal output terminal;

wherein the rope winding control signal is generated based on a wireless control signal received by a wireless communication circuit electrically coupled to the controller.

9. The movable operating apparatus according to claim 1, wherein the buoyance operating end comprises: a swimming mechanism, and a swimming drive motor configured to drive the swimming mechanism to act;

wherein the swimming drive motor is coupled to the battery via an electric line, or is coupled to a second battery carried by the buoyance operating end to obtain power supply; and the swimming drive motor controls the swimming mechanism to swim in at least one direction in response to a swimming trigger signal.

10. The movable operating apparatus according to claim 9, wherein the swimming drive motor is coupled to the battery via the electric line that is located in the traction rope.

11. An automatic pool cleaning device, comprising:

a housing, provided with an accommodation chamber on its surface, wherein a movable operating apparatus of claim 1 is provided in the accommodation chamber; and a circuit system, arranged in the housing, comprising: a battery, a wireless communication circuit, and a controller, wherein the controller is coupled to the battery and the wireless communication circuit; and the controller is electrically coupled to the lock control circuit in the movable operating apparatus.

12. The automatic pool cleaning device according to claim 11, wherein the controller is configured to, when detecting a signal indicating to stop working, control the automatic pool cleaning device to move close to an edge of a pool.

* * * * *